(12) United States Patent
Villwock et al.

(10) Patent No.: US 6,860,289 B2
(45) Date of Patent: Mar. 1, 2005

(54) SURGE TANK

(76) Inventors: Robert Donald Villwock, 10555 Bragg Ave., Grass Valley, CA (US) 95945; Joseph Richard Cochran, 11997 Hanley Dr., Grass Valley, CA (US) 95945

( * ) Notice: Subject to any disclaimer, the term of this patent is extended or adjusted under 35 U.S.C. 154(b) by 72 days.

(21) Appl. No.: 10/412,606

(22) Filed: Apr. 10, 2003

(65) Prior Publication Data

US 2004/0020540 A1 Feb. 5, 2004

Related U.S. Application Data

(60) Provisional application No. 60/372,270, filed on Apr. 11, 2002.

(51) Int. Cl.[7] .............................................. B65D 25/04
(52) U.S. Cl. ...................................... 137/592; 220/86.1
(58) Field of Search ................................ 137/590, 592, 137/565.34; 220/86.1

(56) References Cited

U.S. PATENT DOCUMENTS

| | | | |
|---|---|---|---|
| 832,710 A | 10/1906 | Wade | |
| 1,560,826 A | 11/1925 | Kirschbraun | |
| 2,284,350 A | 5/1942 | Thwaits | 220/86 |
| 2,584,424 A | 2/1952 | Cornell | 260/417 |
| 2,932,318 A | 4/1960 | Ostberg | 137/592 |
| 3,058,622 A | 10/1962 | Ballestra | 222/77 |
| 4,230,630 A | 10/1980 | Mag et al. | 260/428 |
| 4,334,991 A | 6/1982 | Beede | 210/232 |
| 4,436,429 A | 3/1984 | Strong et al. | 366/2 |
| 4,721,448 A | 1/1988 | Irish et al. | 425/144 |
| 4,759,632 A | 7/1988 | Horiuchi et al. | 366/2 |
| 4,810,098 A | 3/1989 | Kano et al. | 366/162 |
| 4,824,032 A | 4/1989 | Johansson | 241/46 B |
| 4,844,276 A | 7/1989 | Kunze et al. | 220/5 A |
| 4,859,072 A | 8/1989 | Fey et al. | 366/165 |
| 4,883,363 A | 11/1989 | Pillon et al. | 366/157 |
| 4,955,723 A | 9/1990 | Schneider | 366/136 |
| 5,101,849 A | 4/1992 | Richard | 137/15 |
| 5,222,807 A | 6/1993 | Gaddis | 366/167 |
| 5,478,147 A | 12/1995 | O'Brien et al. | 366/66 |
| 5,580,168 A | 12/1996 | Alireza et al. | 366/153.1 |
| 5,951,161 A | 9/1999 | Blagg | 366/152.6 |
| 6,039,470 A | 3/2000 | Conwell | 366/137 |

Primary Examiner—John Rivell
(74) Attorney, Agent, or Firm—Kristin C. Castle, Esq.

(57) ABSTRACT

The disclosed device is directed towards a surge tank. The surge tank comprises a side wall including an interior surface. A bottom of tank is coupled to the side wall, wherein the side wall and the bottom of tank define an interior of the surge tank and an exterior of the surge tank. At least one inlet is configured to fluidly couple the exterior of the surge tank with the interior of the surge tank. A weir is fluidly coupled to the inlet at the interior of the surge tank. A flexible element is coupled to the weir proximate to the bottom of tank. An outlet is defined in the bottom of tank.

18 Claims, 2 Drawing Sheets

SURGE TANK

PRIORITY CLAIM

This application claims priority to Provisional Patent Application No. 60/372,270 filed on Apr. 11, 2002.

BACKGROUND

The present invention relates to storage and process devices and more particularly, to a surge tank for degassed process material.

Polyurethane foam can be ground into fine particles using, for example, cryogenic processes or roll mills. These fine particles can then be used, for example, to replace chemicals in recipes for new polyurethane or new foam; this provides an environmental benefit and often a cost savings. "Polyurethane" (PUR) describes a general class of polymers prepared by polymerization of diisocyanate molecules and one or more active-hydrogen compounds. "Active-hydrogen compounds" include polyfunctional hydroxyl-containing (or "polyhydroxyl") compounds such as diols, polyester polyols, and polyether polyols. Active-hydrogen compounds also include polyfunctional amino-group-containing compounds such as polyamines and diamines. An example of a polyether polyol useful in recipes for flexible polyurethane foam is a glycerin-initiated polymer of ethylene oxide or propylene oxide.

In order to add polyurethane powder to the recipe, the powder must be mixed with liquid reactants to form a slurry. Although the powder may be mixed with any of the liquid reactants—such as polyol, diisocyanate, water, surfactants, catalysts, and the like—it is generally preferred to mix the powder into the one or more liquid reactants that comprise the largest fraction of the mass of the recipe. This recipe component with the most mass is usually polyol. Polyols are described in considerable detail in "Polyurethane Handbook, 2nd ed.," Gunter Oertel, Hanser/Gardner Publications, Inc., 1993, pages 55 to 72. Further, the slurry must be free of entrained bubbles because they create an undesirable irregular cell structure in the foam, including holes and splits. Powder can be mixed with liquid reactants in a batch process by adding a known mass of powder to a known mass of polyol, mixing thoroughly, and allowing sufficient time (generally about 8 to 48 hours) for entrained bubbles to leave the slurry. Such a natural de-gassing process takes a long time because the slurry has a high viscosity, generally about 500 to 20,000 mPa-s. The slurry viscosity increases with powder concentration, and concentrated slurries can have a viscosity in excess of 20,000 mPa-s. A continuous process for removal of entrained air is preferred over a batch process because the continuous process would not require waiting for entrained air to leave the slurry naturally, and the continuous processes would not require the large storage capacity necessary to hold the slurry needed for an entire day of foam production.

A need exists for devices and processing methods to take finely ground polyurethane-foam particles, disperse them as a slurry in polyol, remove substantially all entrained bubbles from the slurry, and to use this slurry as a direct replacement for at least some of the polyol in the production of new polyurethane articles. It is further desirable for such a process to be able to run continuously, such that powder and polyol are mixed, de-gassed, and used to make new polyurethane articles without delay. The desired continuous process must be able to deliver bubble-free slurry with accurately controlled solids concentration at an accurately controlled flow rate.

SUMMARY

The present system comprises devices, methods and an integrated process for the continuous production of substantially bubble-free slurries of solid powders in liquids and for the delivery of such slurries at an accurately controlled concentration and flow rate. The devices comprise a surge tank.

Powder and liquid (for example, finely ground polyurethane powder and polyol liquid) are delivered continuously to a mixer where they are contacted intimately and a slurry is produced. The slurry, which may contain entrained air bubbles, is delivered from the mixer to a de-gassing step, where entrained bubbles are continuously removed. The slurry is then delivered to a surge tank that receives the de-gassed slurry and contains the slurry in the absence of reintroduction of air into the de-gassed slurry.

A slurry produced continuously in this way can be delivered to intermediate storage, or can be uses directly in subsequent processes. The manufacture of polyurethane foam is an example of subsequent processes.

The disclosed device is directed towards a surge tank. The surge tank comprises a side wall including an interior surface. A bottom of tank is coupled to the side wall, wherein the side wall and the bottom of tank define an interior of the surge tank and an exterior of the surge tank. At least one inlet is configured to fluidly couple the exterior of the surge tank with the interior of the surge tank. A weir is fluidly coupled to the inlet at the interior of the surge tank. A flexible element is coupled to the weir proximate to the bottom of tank. An outlet is defined in the bottom of tank.

A method of use for a surge tank is disclosed. The method comprises receiving a degassed slurry in an inlet formed in a side wall, the side wall being couple to a bottom of tank, wherein the side wall and the bottom of tank define an interior and exterior of the surge tank. The method includes flowing the degassed slurry into a weir, the weir being fluidly coupled to the inlet. The weir including a chute. The method includes directing the degassed slurry toward an interior surface of the side wall through the chute. The method also includes flowing the degassed slurry along the interior surface toward the bottom of tank through a flexible element in the absence of air entrainment into the degassed slurry. The method includes containing the degassed slurry in the interior proximate to the bottom of the tank.

BRIEF DESCRIPTION OF THE ATTACHED DRAWINGS

DETAILED DESCRIPTION

A surge tank is disclosed. The surge tank is designed to receive material (i.e., de-gassed slurry) delivered to the surge tank and store the slurry for a period of time before being further processed. Material, such as at least one liquid, is delivered to the surge tank having been de-gassed. The surge tank receives the material in a tank and stores the material without reintroducing air into the material. At least one liquid (e.g., polyol) having suspended particulate forming a slurry is delivered to the surge tank. The liquid can be continuously drawn from the bottom of the surge tank at a controlled rate.

Figure 2:
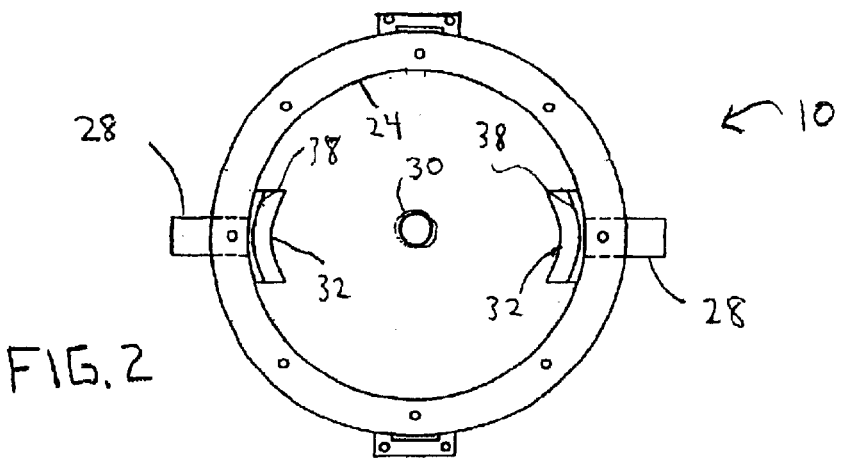
FIG. 2 is a top view of exemplary surge tank.
Figure 1:
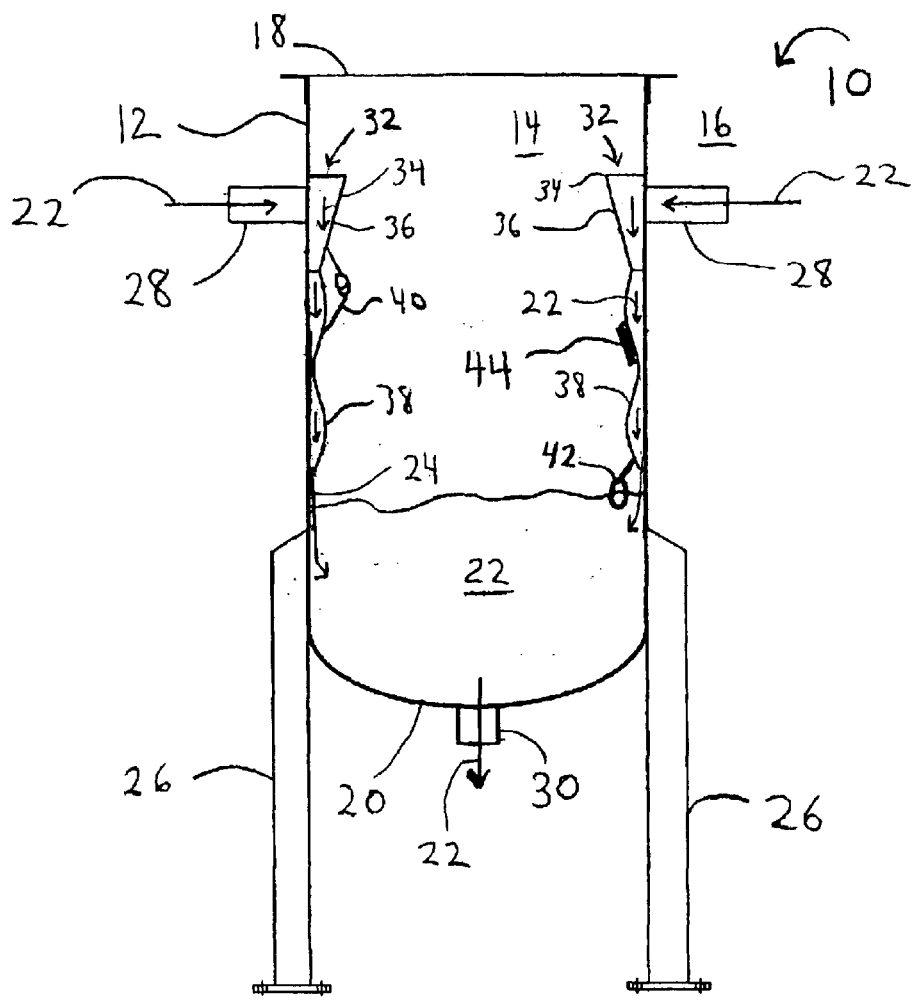
FIG. 1 is a side view illustration of an exemplary surge tank.

Referring now to FIGS. 1 and 2, an exemplary surge tank is illustrated. The surge tank 10 comprises a side wall 12 defining an interior of the tank 14 and an exterior of the tank 16. The side wall 12 is coupled to a top of the tank 18. A bottom of the tank 20 is coupled to the side wall 12 opposite of the top of the tank 18. The side wall 12, top of tank 18 and bottom of tank 20 are configured to retain material 22, such as slurry. In a preferred exemplary embodiment, the slurry comprises a blend of liquid, such as, polyol and suspended powder, such as, finely ground polyurethane-foam particles. The side wall 12 is substantially vertical with respect to gravity. The side wall 12 includes an interior surface 24. The interior surface 24 can be smooth having no appreciable discontinuities. In exemplary embodiments, the interior surface 24 provides for a low coefficient of friction to materials that are processed in the surge tank 10. The low friction surface 24 inhibits cascading effects and subsequent air entrainment as the materials flow along the side wall 12. The interior surface 24 can have a uniform finish or can include variations in surface finish along sections to enhance fluid flow characteristics along the interior surface 24 to inhibit air entrainment. Supports 26 are coupled to the side wall 12 proximate to the bottom of the tank 20. The supports 26 support the tank 10 and provide attachment to floors and the like. In exemplary embodiments, the supports 26 can be arranged in various arrangements relative to the side wall 12 and bottom 20.

At least one tank inlet 28 is formed in the side wall 12 between the top of the tank 18 and the bottom of the tank 20. In an exemplary embodiment, the tank inlet 28 is located above the bottom of the tank 20 about two-thirds up the side wall 12. Two tank inlets 28 are shown as an exemplary embodiment in FIGS. 1 and 2. The tank inlet 28 is configured to intake the material 22, depicted as flow arrows in FIG. 1, to the interior of the tank 14. A tank outlet 30 is formed in the tank bottom 20. The tank outlet 30 is configured to allow for the discharge of materials 22 from the interior of the tank 14. The surge tank 10 and the contents are under atmospheric pressure under normal operating conditions.

A weir 32 is fluidly coupled to the inlet 28 at the interior 14 of the surge tank 10. The weir 32 can be coupled to the side wall 12. The weir 32 is configured to receive the materials 22 from the inlet 28 and to divert the flow of the materials 22 into the tank interior 14 along the interior surface 24 in the absence of introducing air into the materials 22. The preferred exemplary embodiment, weir 32 diverts the material 22 flow in the direction of gravity toward the bottom 20. The weir 32 includes a body 34 having at least one chute 36. The chute 36 directs the flow of the material 22 flowing into the weir 32 toward the interior surface 24 of the side wall 12. The chute 36 can be formed in as a rigid structure and/or as a flexible structure. The chute 36, in an exemplary embodiment, can be formed as a spiral along the interior surface 24. The chute 36 maintains flow and inhibits the introduction of air into the material 22. The body 34 of the weir 32 can conform to the contour of the side wall 12. In the exemplary embodiment illustrated, the contour of the side wall 12 is curved since the surge tank 10 is a cylindrical shape. Thus, the body 34 of the weir 32 is curved to match the contour of the side wall 12. Forming the body 34 to conform with the shape of the side wall 12 and specifically with the interior surface 24, reduces the discontinuities in the flow path and reduces portions that may introduce air into the material 22. The weir 32 body 34 is illustrated as being a fraction of the total internal diameter of the side wall 12. The weir 32 can be sized variably to match the material 22 flow rates entering the surge tank 10. In alternate exemplary embodiments, the weir 32 can be expandable and vary the size and shape of the body 34 and chute 36 to adapt to the type and quantity of the material 22 being processed.

A flexible element 38 can be coupled to the weir 32 proximate to the chute 36. The flexible element 38 directs the flow of the material 22 along the interior surface 24 of the side wall 12. The flexible element 38 can comprise a plastic material, polyethylene sheet, and the like. The flexible element 38 illustrated at FIG. 1 includes a serpentine shape to demonstrate that the flexible element conforms to the shape of the material flowing. Various shapes can be utilized for the flexible element 38. The flexible element can span the width of the chute 36 along the interior surface 24. The flexible element 38 can be biased toward the interior surface 24. A biasing member 40 can be coupled to the flexible element 38 to provide a bias toward the interior surface 24. A weight 42 can be coupled to the flexible element 38 to provide a bias and/or negate any buoyant properties of the flexible element 38 in the surge tank 10 as the level of the material 22 rises in the interior 14 and contacts the flexible element 38 on all sides. The biasing member 40 can also serve to prevent the flexible element 38 from floating away from the interior surface 24 as a result of positive buoyancy with the material 22. It is contemplated that structural portions 44 can be employed with or made integral to the flexible element 38 in order to enhance the fluid flow characteristics of the flexible element 38 such that the flexible element 38 receives and directs the material 22 along the interior surface 24 and into the surge tank 10 while limiting the mixture of air with the material 22.

Figure 3:
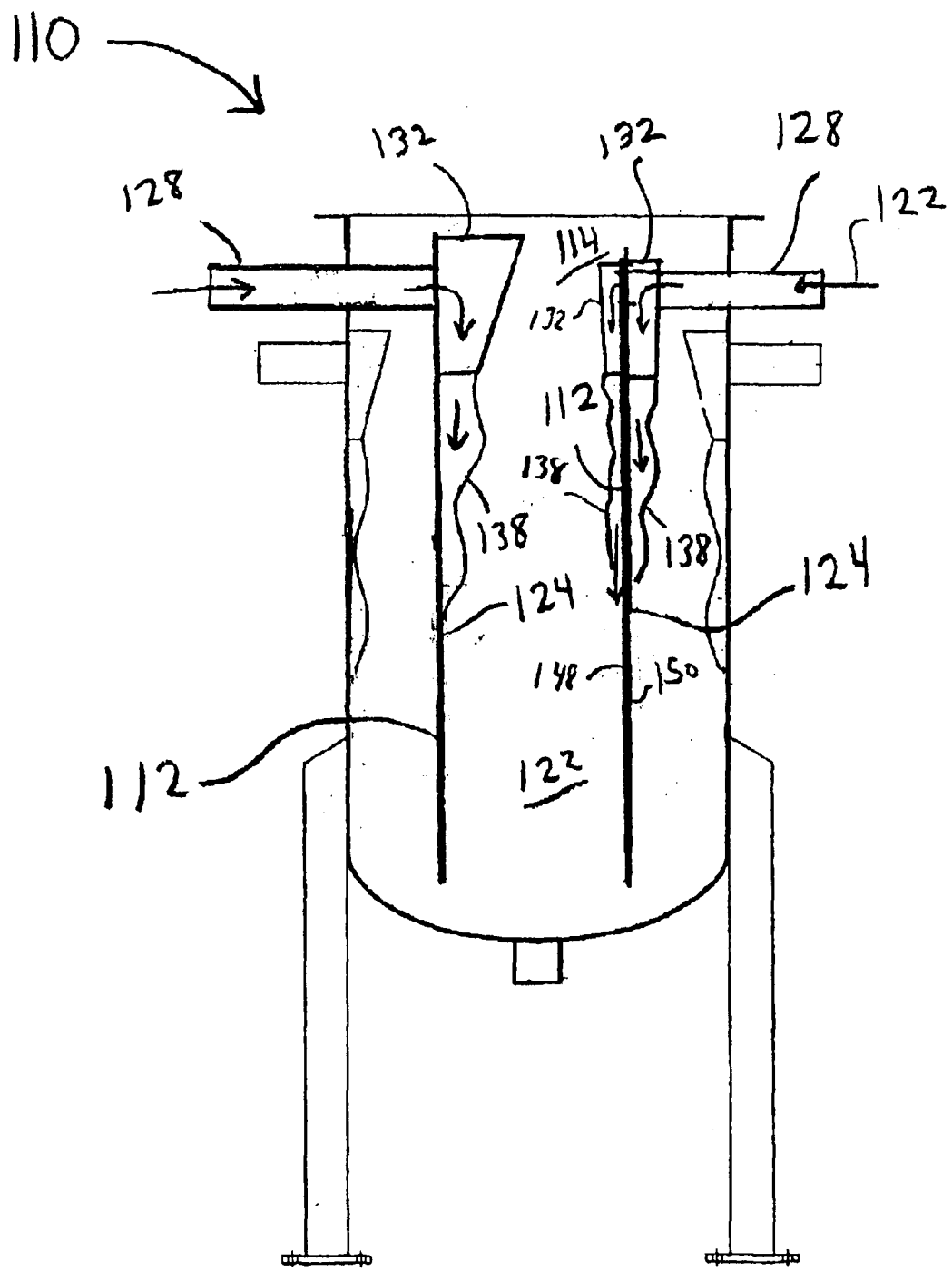
FIG. 3 is a side view illustration of another exemplary surge tank.

FIG. 3 illustrates an exemplary alternative embodiment. In the exemplary alternative embodiment a surge tank 110 includes additional wall 112 disposed at the interior of the tank 114. Additional inlet 128 and weir 132 including flexible element 138 assemblies can be coupled to the wall 112 on either side. This arrangement can be duplicated to include a plurality of additional walls 112 at the interior 114. The alternative embodiment illustrated depicts the capability to increase the area of interior surfaces 124 to allow for larger flow capacity of material 122 into the surge tank 110 while limiting the air mixing with the material 122. The additional wall 112 can include a first wall surface 148 and a second wall surface 150 such that material 122 can flow along both wall surfaces 148 and 150 to provide a large flow rate into the surge tank 110. The dimensions of the weir 132 can be altered as well, to process larger mass flow rates.

In an exemplary operation the surge tank 10 operates to receive degassed slurry 22 at inlets 28. The degassed slurry 22 impinges on and flows through the weir 32 into the chute 36 and toward the flexible element 38. The force of gravity as well as fluid pressure drive the slurry 22 down into the interior 14 toward the tank bottom 20. The slurry 22 is directed against the interior surface 24 along the side wall 12. The slurry 22 flows with minimal mixing and virtually no entraining of air into the slurry 22. The flexible element 38 maintains contact with the slurry 22 as the slurry 22 flows along the interior surface 24. Exposure to air and air entrainment is limited. As the slurry level raises in the surge tank 10, the flexible element 38 maintains a positive bias against the slurry 22 along the interior surface 24. Since the principle modes of air mixing such as jetting, splashing and material raining within the surge tank 10 are not present, entraining of air bubbles is virtually eliminated.

While embodiments and applications of this disclosure have been shown and described, it would be apparent to those skilled in the art that many more modifications than mentioned above are possible without departing from the inventive concepts herein. The disclosure, therefore, is not to be restricted except in the spirit of the appended claims.

What is claimed is:

1. A surge tank comprising:
   a side wall including an interior surface;
   a bottom of tank coupled to said side wall, wherein said side wall, and said bottom of tank define an interior of the surge tank and an exterior of the surge tank;
   at least one inlet configured to fluidly couple said exterior of the surge tank with said interior of the surge tank;
   a weir fluidly coupled to said inlet at said interior of the surge tank;
   a flexible element coupled to said weir proximate to said bottom of tank; and
   an outlet defined in said bottom of tank.

2. The surge tank of claim 1 further comprising:
   a biasing member coupled to said flexible element, said biasing member configured to bias said flexible element toward said side wall.

3. The surge tank of claim 1 wherein said interior surface is configured to allow material flow along said interior surface in the absence of air entrainment.

4. The surge tank of claim 1 wherein said weir defines a body having a chute configured to receive flowing material and direct the flowing material toward said side wall along said interior surface.

5. The surge tank of claim 1 wherein said interior surface includes a low coefficient of friction to materials processed in the surge tank.

6. The surge tank of claim 1 wherein said interior surface includes variation in surface finish configured to enhance fluid flow characteristics along said interior surface.

7. The surge tank of claim 1 wherein said weir conforms to the contours of the interior surface.

8. The surge tank of claim 1 wherein said weir is variable in size.

9. The surge tank of claim 1 wherein said weir is expandable.

10. The surge tank of claim 1 wherein said flexible element includes a weight coupled to said flexible element, said weight is configured to maintain said flexible element submerged in said material.

11. The surge tank of claim 1 wherein said flexible element includes at least one structural portion configured to reduce the entrainment of air.

12. The surge tank of claim 1 further comprising:
    at least one additional wall disposed in said interior;
    an additional inlet coupled to said additional wall;
    an additional weir fluidly coupled to said additional inlet; and
    an additional flexible element coupled to said additional weir.

13. The surge tank of claim 12 wherein said additional wall includes a first wall surface and a second wall surface configured to maintain material flow along said first wall surface and said second wall surface in the absence of air entrainment.

14. A method of use for a surge tank comprising:
    receiving a degassed slurry in an inlet formed in a side wall, said side wall being couple to a bottom of tank, wherein said side wall and said bottom of tank define an interior of the surge tank and exterior of the surge tank;
    flowing said degassed slurry into a weir, said weir being fluidly coupled to said inlet, said weir including a chute;
    directing said degassed slurry toward an interior surface of said side wall through said chute;
    flowing said degassed slurry along said interior surface toward said bottom of tank through a flexible element in the absence of air entrainment into said degassed slurry; and
    containing said degassed slurry in said interior proximate to said bottom of said tank.

15. The method of claim 14 further comprising:
    biasing said flexible element against said degassed slurry toward said interior surface.

16. The method of claim 14 wherein flowing said degassed slurry along said interior surface includes employing gravitational forces and fluid pressure.

17. The method of claim 14 eliminating the effects of buoyancy on said flexible element in said degassed slurry contained in said interior of the surge tank.

18. The method of claim 14 further comprising:
    directing said degassed slurry toward an additional wall from an additional weir; and
    flowing said degassed slurry along said additional wall in the absence of air entrainment toward said bottom of tank.

* * * * *